United States Patent [19]

Vachon

[11] Patent Number: 5,287,122
[45] Date of Patent: Feb. 15, 1994

[54] SYSTEM AND METHOD OF SELECTING THE REPRODUCIBLE COLORS IN A DISCRETE REPRODUCTION SYSTEM

[75] Inventor: Guy P. Vachon, Austin, Tex.

[73] Assignee: Schlumberger Technology Corporation, Austin, Tex.

[21] Appl. No.: 572,205

[22] Filed: Aug. 23, 1990

[51] Int. Cl.$^5$ .............................................. B41J 2/36
[52] U.S. Cl. .................................. 346/1.1; 346/76 PH
[58] Field of Search .................... 346/76 PH, 1.1; 358/298; 400/120

[56] References Cited

U.S. PATENT DOCUMENTS

| | | | |
|---|---|---|---|
| 4,768,042 | 8/1988 | Zama | 346/76 PH |
| 4,806,950 | 2/1989 | Sekine et al. | 346/76 PH |
| 4,949,135 | 8/1990 | Ng | 355/327 |
| 5,025,267 | 6/1991 | Schofield et al. | 346/76 PH |

FOREIGN PATENT DOCUMENTS 0168818 1/1986 European Pat. Off. .
0313794 5/1989 European Pat. Off. .

Primary Examiner—Benjamin R. Fuller
Assistant Examiner—N. Le
Attorney, Agent, or Firm—Charles D. Huston

[57] ABSTRACT

A method of reproduction in a discrete reproduction system where the available colors are arranged in equally perceptible steps. Because in a discrete reproduction system only a limited set of points can be produced from the gamut of colors, the present method selects the color variables describing the set of points such that the difference between colors is equiperceptible. Preferably, a numerical approximation to the Munsell book of color is used to determine the hue, saturation, and luminance of the colors used in the reproduction system.

The preferred embodiment is a gray scale printer where the preceived contrast between levels of gray is uniform—i.e. equiperceptible. To achieve equiperceptible gray scale requires that the increments in print density be nonuniform. To determine the desired print density to achieve an equiperceptible gray scale, the print density is determined using a numerical approximation of the Munsell value coordinates.

11 Claims, 5 Drawing Sheets

FIGURE 3A *Prior Art*
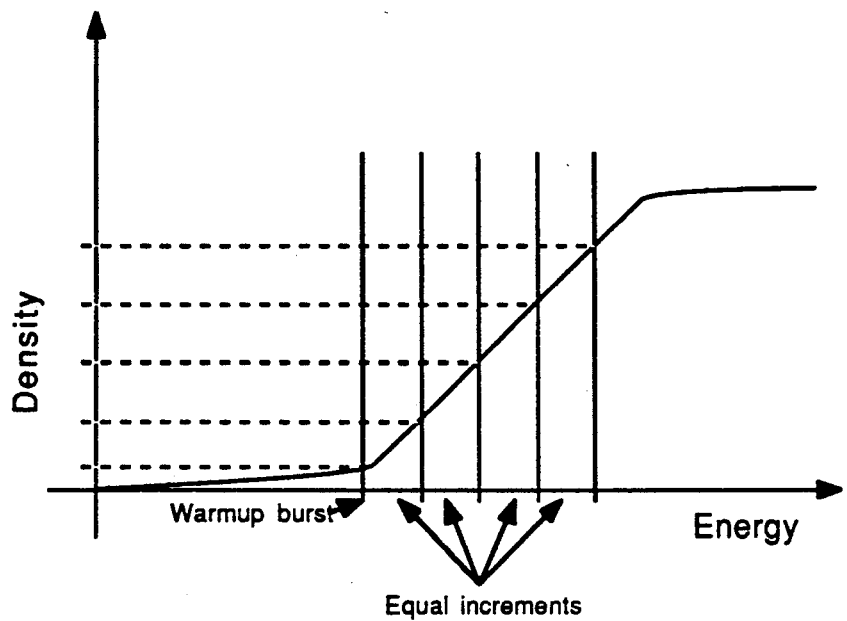
FIGURE 3B
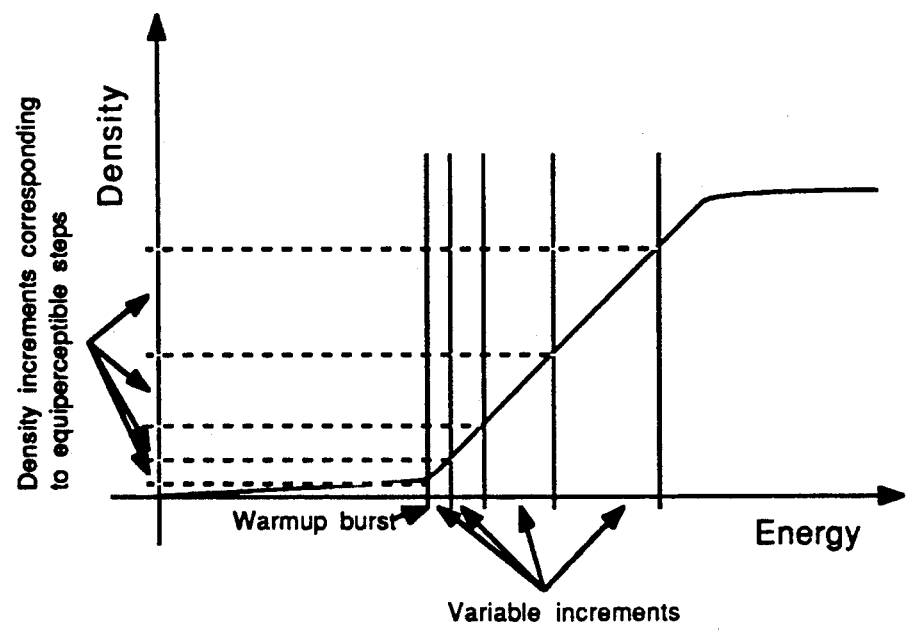

FIGURE 6A *Prior Art*
Old:
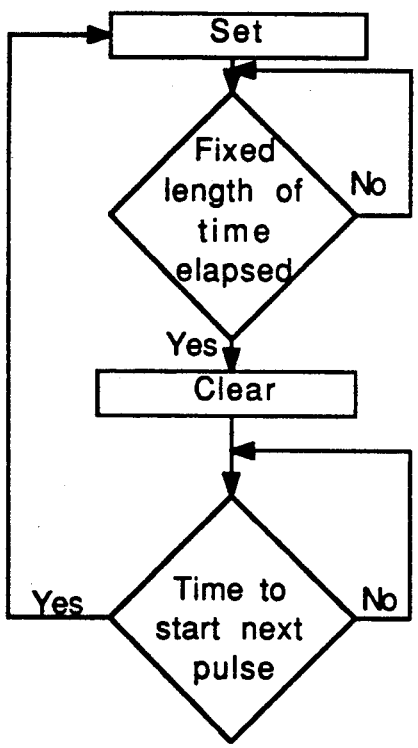
FIGURE 6B
New:
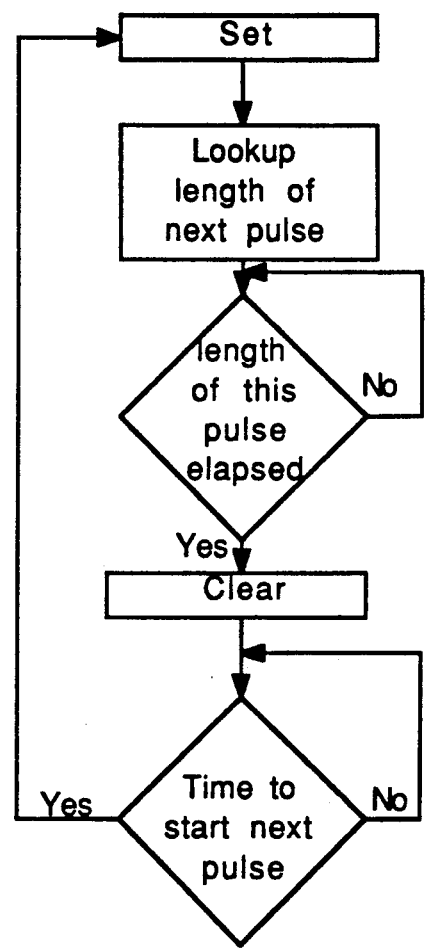

SYSTEM AND METHOD OF SELECTING THE REPRODUCIBLE COLORS IN A DISCRETE REPRODUCTION SYSTEM

BACKGROUND OF INVENTION

1. Field of the Invention

The present invention relates to a system and method for selecting equally perceptible colors for use in a discrete reproduction system. In particular, the preferred embodiment of the present invention describes a gray scale printer in which the increments between levels of gray are equally perceptible.

2. Description of Related Art

In a continuous tone reproduction system, all points in the gamut can be produced. Photography is an example of a continuous tone reproduction system. The "gamut" of the printing process is defined as the locus of points in the color space that can be reproduced. In contrast, a discrete reproduction system can only produce a certain set of points. For example, most computer printers are discrete reproduction systems in that only a finite number of picture elements can be stored for reproduction and the elements to be reproduced are stored digitally, so a limited number of points from the gamut are used. Therefore, a computer printer would only need to reproduce a limited number of points in the gamut. There are of course, many types of discrete reproduction systems, such as full color printers, black and white printers, digital cameras, etc.

The present invention is concerned, in general, with the problem of selecting the colors for use in a discrete reproduction system so that the selected colors are maximally distinct from each other. This problem is solved by using equiperceptible steps between colors. "Equiperceptible steps" means herein that the perceived difference between consecutive steps or levels is approximately equal for all steps. The preferred embodiment selects the print density in a gray scale printer such that the levels of gray are equiperceptible.

There are several methods for operating a gray scale printer. One method is to fill in multiple pixels representing a character with black or white on a selected basis to approximate the desired level of gray of the character. This process is known as "dithering" and is quite useful where low resolution is acceptable. Another common method of gray scale printing is to adjust the print density on the paper according to the level of gray desired. The typical gray scale implementation utilizes equal increments in print density to reproduce the corresponding gray scale levels. For example, a four bit gray scale printer can reproduce sixteen levels of gray and the conventional gray scale printer would reproduce sixteen levels of gray (including white and black) with uniform density steps between gray levels.

The difficulty with such conventional gray scale printers is that the human visual apparatus does not respond uniformly to density differences. In fact, the perceived contrast between two steps is related inverse exponentially to their mean density. This causes a given increment in print density between light shades of gray to be far more apparent to the human eye than an identical increment in print density between dark shades. This is readily apparent if observing a gray scale test pattern (where e.g., the sixteen gray levels are printed consecutively). In such a gray scale test pattern there is considerable contrast between the light shades of gray while the contrast between the dark shades are almost indistinguishable. It is, of course, desirable that the contrast between adjacent shades of gray be maximized so that each level of gray can be more easily distinguished from an adjacent level.

One type of gray scale printer uses direct thermal paper, such as used for facsimile transmission, calculators, and computer output. Direct thermal paper imaging consists of:

1. Converting electrical signals to heat.
2. Transferring the heat to the surface of a specially treated paper.
3. Darkening of heated areas as a chemical reaction occurs.

However, gray scale thermal printers have the same deficiency as other types of gray scale printers—i.e. the lack of contrast between the darker shades of gray.

Of course, this problem of lack of contrast between certain color levels is not limited to monochrome printers, and is present in practically any discrete reproduction system.

SUMMARY OF THE INVENTION

The problems outlined above associated with selecting the color points to be reproduced in a discrete reproduction printing system are generally solved by the method and apparatus of the present invention. That is, the present invention selects the color points to optimize the perceived contrast between the reproducible points available to the system. The perceived distance between adjacent color points in the color space is maximized by approximating equiperceptible increments between the color points within the gamut.

Broadly speaking, the method of the present invention for selecting the colors within a color space for use in a discrete reproduction printing system includes the steps of: defining the gamut of the color space for the printing system and determining the maximum number of points that can be reproduced within the discrete reproduction printing system. A certain number of color points—less than or equal to the maximum number of reproducible points—are plotted in the gamut with the perceived distance between adjacent color points maximized. This achieves a distance approximately equal between all plotted color points to approximate equiperceptible increments between the plotted color points within the gamut. Preferably, the gamut is mapped onto a Uniform Color Space where equiperceptible steps are achieved by making the points approximately equidistant apart in the Uniform Color Space. In a "Uniform Color Space" distance within the space is directly proportional to perceived difference in color. In a preferred embodiment, the discrete reproduction printing system processes data digitally, and the method includes the steps of: digitally representing the plotted color points available to the system, storing the digital values of the plotted points, and retrieving the digital values as required during the printing process to selectively reproduce the plotted color points.

In the preferred embodiment of the present invention the discrete reproduction printing system is a gray scale thermal printer and the gamut is the locus of points ranging between paper white and paper black. The terms "white" and "black" are understood in this application as relative terms meaning e.g. the "whitest" white or "blackest" black achievable with the reproduction system on the media in use. In this embodiment, the plotting step includes selecting the number of reproducible points approximately equally spaced in luminance from white to black. For example, in this digital system with four bits available, sixteen levels of gray can be reproduced and the plotted levels of gray are equally spaced in perceived luminance from white to black. Here "perceived luminance" means the resulting visual effect. In a preferred form, the perceived luminance of the desired levels of gray can be numerically approximated and the corresponding desired print density determined. In the preferred embodiment, the Munsell values of the gray levels are used to determine the corresponding perceived luminance and desired print density of the gray levels. The Munsell values of the equally spaced points covering the gamut are then numerically approximated and used to compute the digital values stored for use by the printing system. These stored digital values (e.g. pulse widths) are used to control the printhead voltage—and hence print density—to obtain equiperceptible gray levels.

BRIEF DESCRIPTION OF THE DRAWINGS

FIGS. 3A and B show the relationship between density and energy in a thermal paper printing system, where FIG. 3A depicts a prior art method of gray scale printing and FIG. 3B illustrates the present invention where the variable print density increments correspond to equiperceptible steps;

FIG. 6 are the flow charts depicting the operation of the firmware in the Pulse Generator of FIG. 2, where FIG. 6A is the prior art operation and FIG. 6B depicts the operation of the present invention to obtain equiperceptible steps between successive levels of gray print density;

DESCRIPTION OF THE PREFERRED EMBODIMENTS

Generally speaking, the present invention selects the colors for use in a discrete reproduction printing system to maximize the perceived contrast between colors. The method of the present invention is equally applicable to monochrome, two color, and full color systems.

Monochrome System

Figure 4:
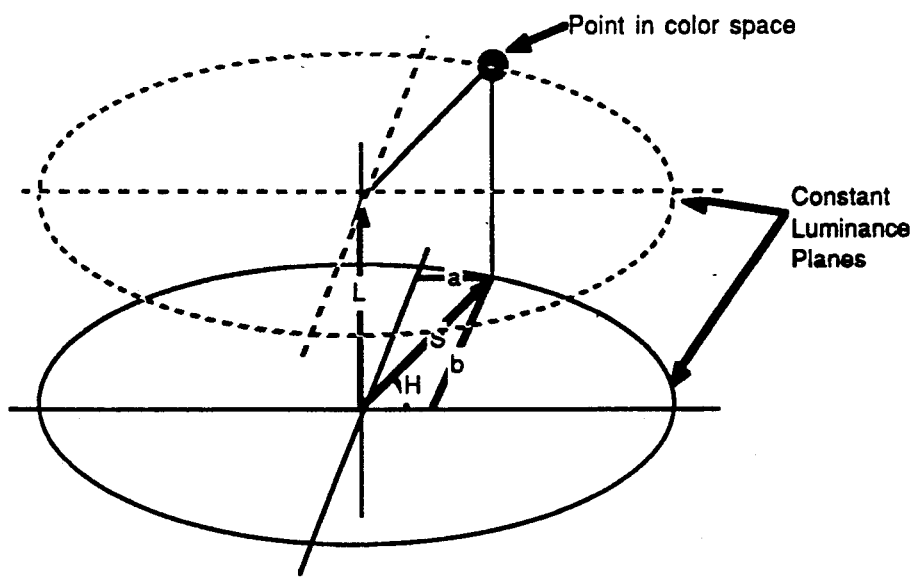
FIG. 4 is a schematic representation of color space depicting constant luminance planes.
Figure 5:
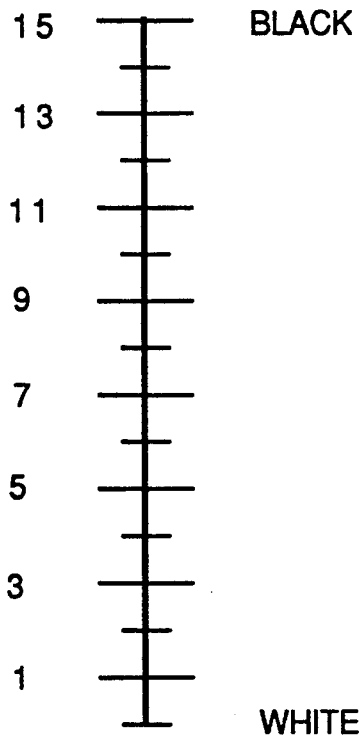
FIG. 5 is a schematic depiction of sixteen levels of reproducible gray equally spaced along the Luminance axis in a monochrome subset of the color space of FIG. 4.
Figure 7:
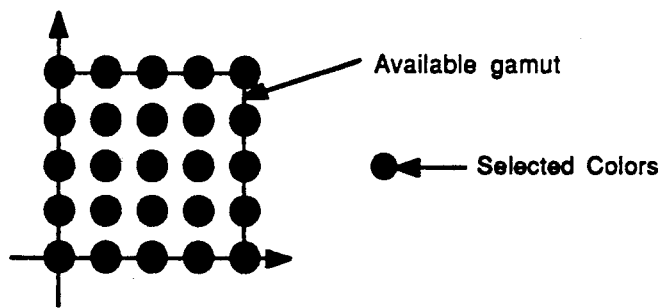
FIG. 7 shows a distribution of the reproducible points in a two color system in accordance with the present invention.

FIGS. 1 through 6 illustrate a monochrome printing system as the preferred embodiment of the present invention. FIG. 4 illustrates a color space model with hue (H), saturation (S), and luminance (L) illustrated to locate a point in the color space. In FIG. 4, a and b simply represent the scalers to accomplish a polar coordinate system to Cartesian coordinate system transformation of the hue (H) and saturation (S) coordinates of the point. As shown in FIG. 5, the luminance or L axis of the color space of FIG. 4 is applicable to a monochrome system. The gamut is the locus of points in the color space that can be reproduced and for the monochrome system of FIG. 5 consists of all levels of gray from white to fully saturated black. Because the printer of the preferred embodiment has four bits in which to store the levels of gray available for reproduction, sixteen different levels of gray are reproducible from white to black as shown in FIG. 5.

Figure 1:
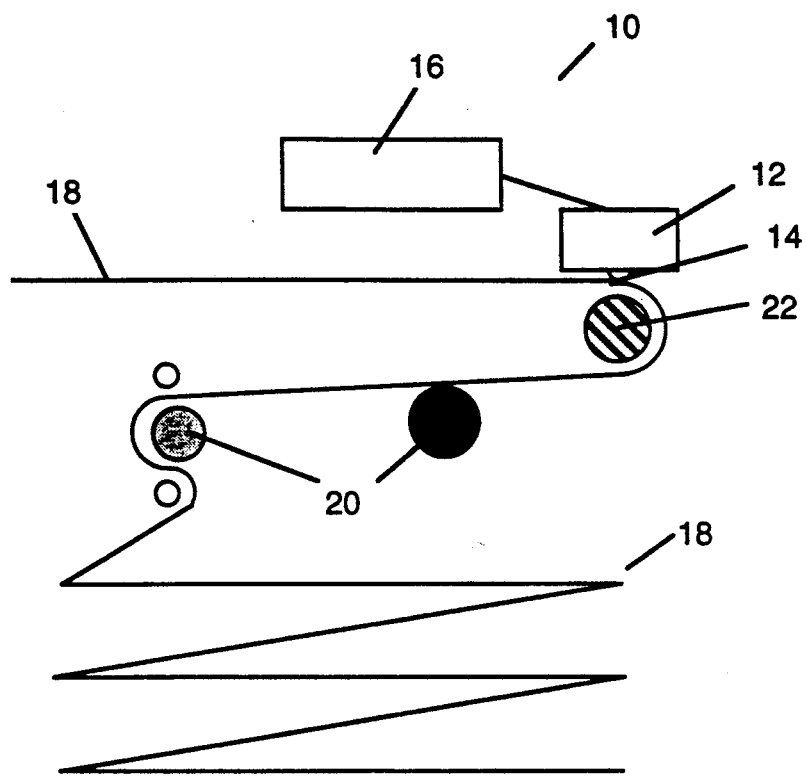
FIG. 1 is a schematic representation of a monochrome thermal printer in accordance with the preferred embodiment of the present invention.

In FIG. 1, a thermal printer 10 is illustrated. The thermal printer 10 uses a printhead 12 having a number of small resistor elements 14 spaced in a single line. A control assembly 16 comprising a number of circuit boards is connected to the printhead 12 to control its operation. The thermal paper 18 is fed through a series of rollers 20 and adjoins the printhead 12 in the vicinity of the platen roller 22 as shown.

The elements 14 are arranged on a low conductivity substrate (not shown) to be independent of each other during heat generation. The elements 14 are a thin film consisting of TaSi, NiCr, or a similar material of 0.1-micron thickness placed on the substrate with vapor-deposit technology.

Other types of thermal heads which might alternatively be used include thick film and semiconductor. The advantages of the thin-film thermal head are:
Better high-speed thermal imaging because of the small thermal mass of the film resistors.
Better gray-scale imaging because thin-film materials can be deposited more uniformly than thick film or semiconductor type materials.

There is a time lag between the application of the electrical heating impulse and achieving maximum temperature at the element 14. This lag time limits the maximum speed at which the thermal printer 10 can run, because the paper 18 cannot be stepped faster than the time it takes for a thermal element 14 to heat up after applying an input pulse and to cool down after its removal.

The mechanics of moving the thermal paper 18 through the print 10 is simplified because the thermal resistor elements 14 extend the entire width of the page. The printhead 12 is held in a fixed position and the paper 18 is moved past the print elements 14 as shown in FIG. 1.

In the printhead 12, the resistors elements 14 are either on or off. This means the resolution of the printhead is equal to the spacing of the elements 14. For example, a spacing of eight resistor elements 14 per millimeter results in a resolution of eight dots per millimeter or approximately 203 dots per inch. The printer 10 of FIG. 1 can be operated in either a "graphics" or "gray scale" mode. To produce gray-scale imaging in the graphics mode, "dithering," or on/off patterns, are generated to simulate shades of gray. This results in about a 94% net decrease in resolution when printing at the lightest shade of 16 gray levels.

Hpwever, when in gray scale mode, the heat applied to each element 14 in the printhead 12 can be controlled individually, making the sixteen gray levels achievable for high-resolution imaging at the element spacing, e.g. eight dots per millimeter.

The density of an image printed on the thermal paper 18 is a function of the following:
Printhead voltage (VH)
Printhead substrate temperature
Printhead strobe width Recent element history
Paper characteristics The higher the thermal printhead supply voltage, the darker the image. This voltage must be within limits specified by the head manufacturer or damage to the head will result. The head supply voltage is usually monitored by circuitry in the printer and is turned off if it goes beyond preset bounds.

The thermal printhead is attached to a block of aluminum whose temperature is regulated around a nominal value of 60 degrees C. (140 degrees F.) by heater strips vulcanized onto the heater block. This block preheats the thermal head and paper to what is called the head substrate temperature. Preheating allows the amount of energy supplied by the thermal head heater elements to be reduced, thus extending the life of the heater elements in the thermal head and ensuring that the sum of the thermal energy transferred to the paper by the preheated head and the heater elements is sufficient to image the paper.

The thermal energy supplied by each individual heater element 14 is determined by the voltage supplied and by the length of time the voltage is applied. As indicated above, the voltage is relatively constant. Therefore the length of time the voltage is applied determines the amount of thermal energy transferred to the paper 18, and hence the density of the print. The length of time that voltage is applied is controlled by a Strobe Width signal.

There are several other variables which necessitate changes in the Strobe Width signal. For example, it takes a certain amount of time for an element 14 to cool down after being energized. By keeping track of which elements 14 were turned on in the previous line, the printer 10 can control the amount of additional heat required for each heater element. Then each element 14 in the head transfers the correct amount of energy to the paper 18. This is especially important for gray-scale imaging.

Additionally, the printing speed is also used to determine strobe width. As the printing speed increases, the strobe width decreases. Further, less sensitive thermal papers require more thermal energy to achieve a given optical density. Less sensitive paper is also better suited to withstand high-temperature storage conditions.

The thermal printer 10, by sensing the paper type (from switch settings), element heating history, and printing speed, controls the image density by changing the strobe width signal appropriately. The head supply voltage is automatically adjusted depending on the resistance of the elements 14 in the thermal head. These adjustments to the head supply voltage are usually minor when compared with the voltage regulation for achieving print density in equiperceptible steps in accordance with the present invention.

Figure 2:
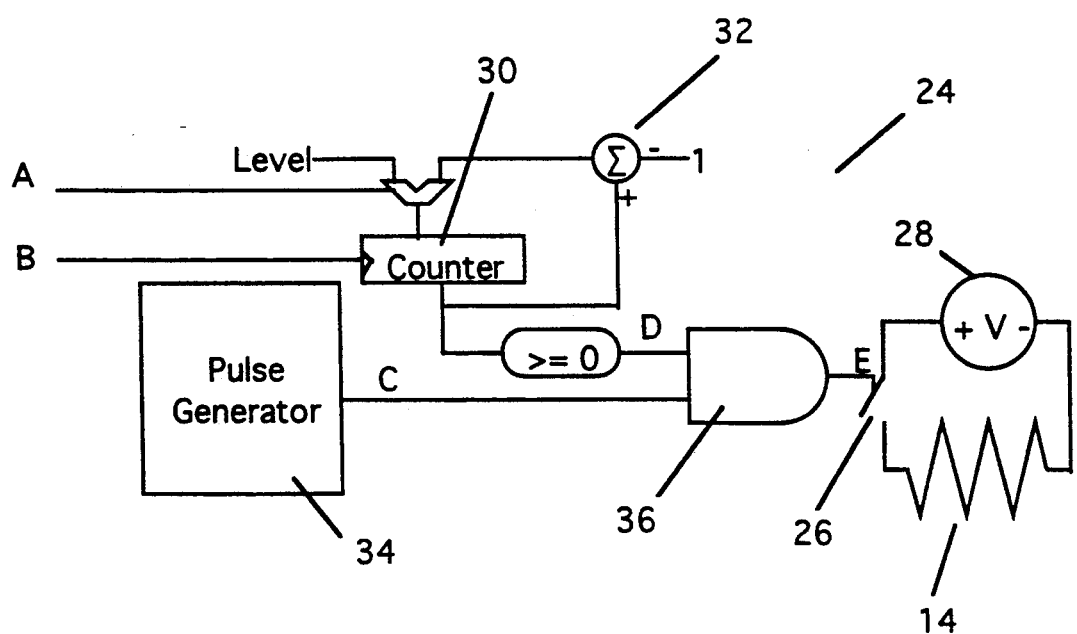
FIG. 2 is a schematic representation of the printing control circuit of the thermal printer of FIG. 1.

Turning to FIG. 2, the basic architecture of the print circuit 24 of the printer 10 is illustrated. The print circuit 24 of FIG. 2 is one of several circuits in the control assembly 16 of FIG. 1 and is essentially replicated for every resistor element 14 in the printhead 12 of the printer 10.

In FIG. 2, E represents the control signal for the switch 26 that feeds power from the power supply 17 to the resistor element 14. To determine the level of gray reproduced on the thermal paper, the energy arriving at resistor element 14 is controlled by pulsing E. In operation, a preheat pulse is delivered initially to the resistor element (see e.g., FIG. 3B). The preheat pulse is approximately the amount of thermal energy that can be transferred to the paper before the paper begins to turn gray. After the preheat pulse, one to fifteen more pulses are delivered to achieve the desired print density on the paper.

In the print circuit 24 of FIG. 2, the A signal controls what value is fed to the counter register 30. At the beginning of the printing cycle, signal A feeds the level to be printed to the counter 30 (0-15). After each pulse of energy is delivered through switch 26, the counter 30 is decremented as at 32 by loading it with one less than its previous value. Signal B is pulsed every time a new value is entered into counter 30. The pulse generator 34 outputs a pulse train C to gate 36. Signal D is the output from counter 30 and remains true until the value on counter 30 becomes negative. Thus, signal D gates pulse train C to produce strobe width E.

EXAMPLE

Assume it is desired to print level "6" then signals A-E are:

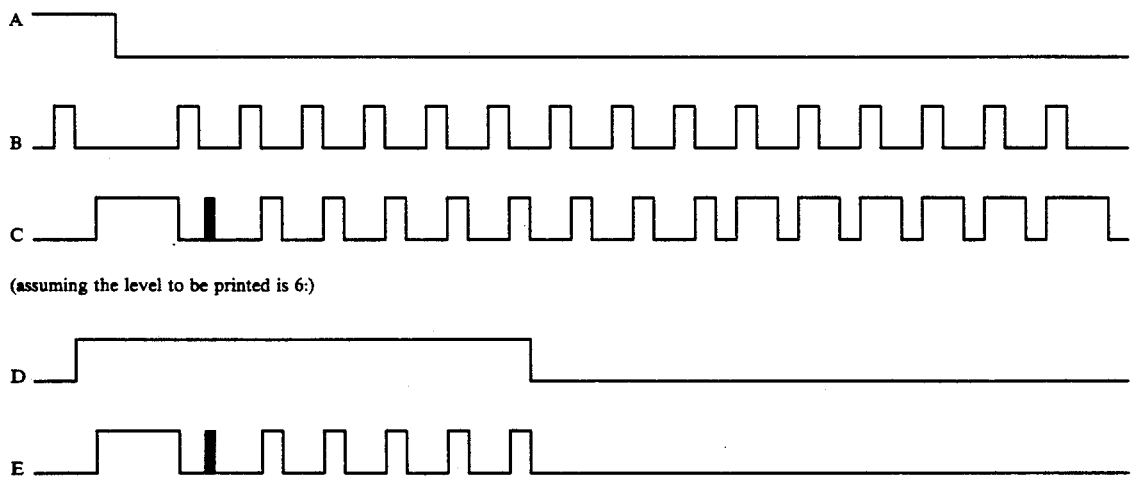

(assuming the level to be printed is 6:)

Prior art pulse generators would simply generate pulses of identical width with the print circuit 24 counting the pulses to obtain the desired print density. Thus, a prior art pulse train C would appear as:

The pulse train C for obtaining equiperceptible print density appears as:

As can be appreciated from FIG. 2, the width of the pulses in pulse train B dictates how long power is supplied to the printhead element 14 to achieve the desired print density. Therefore control of the pulse width of the pulses in pulse train C is controlled to obtain the desired equiperceptible increments in print density.

Operation of the pulse generator 34 is illustrated in FIGS. 6A and 6B. As can be seen in FIG. 6A, under a prior art method, the pulse generator 34 simply determined if the fixed time of each pulse width had elapsed. In contrast, as illustrated in FIG. 6B, the pulse generator 34 of the preferred embodiment of the present invention looks up the length of the next pulse so that each pulse has a different pulse width.

In order to determine the desired pulse width of the pulses in train C, it is necessary to determine the desired print density levels. To determine the desired print density, a numerical approximation to the Munsell book of color is used. The Munsell book of color is a collection of color samples arranged in equally perceptible hue, saturation, and luminance steps. In a monochrome printer, only the luminance steps are used as illustrated in FIG. 5 The CIE Lab Uniform Color Space was used to select equally perceptible light levels as a numerical approximation to the Munsell book of color. While many numerical approximations are available, the cube root approximation was used:

$$\text{Munsell Value } (L) = 25 \sqrt[3]{\frac{100\, Y_n}{Y_o}} - 16$$

Where Y is the luminance of the desired gray level and $Y_o$ is the reference white luminance. The luminance of the different gray levels can be derived from the density in that the density is:

$$d_n = -\log_{10} Y_n \rightarrow Y_n = 10^{-d_n}$$

From here we see that:

$$L_0 = 25 \sqrt[3]{100} - 16 \text{ and } L_{15} = 25 \sqrt[3]{100 \cdot 10^{d_0 - d_{15}}} - 16$$

where $d_0$ is the density of white and $d_{15}$ is the density of fully saturated black. The intermediate steps are $$L_n = n \cdot K + L_0 \text{ where } K = \frac{L_{15} - L_0}{15}$$

The resulting values for the 0-15 gray levels are:

| | L | Y | d |
|---|---|---|---|
| 0 | 100 | .89 | .05 |
| 1 | 95 | .78 | .11 |
| 2 | 91 | .69 | .15 |
| 3 | 86 | .61 | .22 |
| 4 | 81 | .52 | .28 |
| 5 | 77 | .46 | .34 |
| 6 | 72 | .39 | .41 |
| 7 | 67 | .33 | .49 |
| 8 | 63 | .28 | .55 |
| 9 | 58 | .23 | .64 |
| 10 | 53 | .19 | .73 |
| 11 | 49 | .16 | .81 |
| 12 | 44 | .12 | .91 |
| 13 | 39 | .09 | 1.02 |
| 14 | 35 | .08 | 1.12 |
| 15 | 30 | .06 | 1.25 | where
L = Munsell value
Y = Luminance
d = print density

The computed densities (d) are used to compute the individual pulse widths in the pulse train C.

Turning to FIG. 3, another contrast between prior art methods and the present invention is illustrated. As shown in prior art FIG. 3A, equal increments of energy were delivered to the printhead producing equal increments in print density. The difficulty is that the perceived contrast between two print levels is related inverse exponentially to print density. In comparison, the printer 10 of the preferred embodiment of the present invention reproduces sixteen equiperceptible steps where the observed contrast between print levels remains uniform. FIG. 3B illustrates the nonuniform increments in print density obtained by applying variable energy increments to the print elements 14 in contrast to the sixteen uniform density steps as illustrated in FIG. 3A.

There are, of course, many variations possible in a monochrome reproduction system without departing from the scope of the invention. For example, alternative media such as film might be used, the printing system might be an ink jet system, or the color might be different, say light pink to dark scarlet.

Two Color System

The concept of equiperceptible steps applied to the monochrome printer of the preferred embodiment can easily be extended to any subset of a printing process's gamut. Due to physical constraints, all reproduction systems processes have a limited gamut. In a discrete reproduction system only a certain number of points in the gamut can be produced. For example, a discrete reproduction system which stores data digitally can reproduce only a limited set of colors. In a four bit system, sixteen colors can be reproduced.

The most efficient use of the limited gamut in a discrete reproduction system maximizes the contrast between colors to achieve equiperceptible differences between colors in accordance with the present invention.

Figure 8:
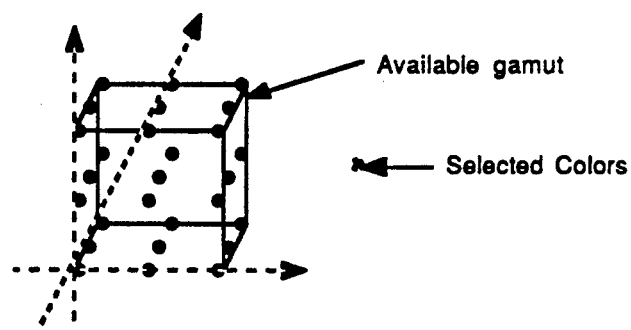
FIG. 8 graphically illustrates a distribution of the reproducible points in a full color system in accordance with the present invention.

FIG. 8 illustrates a two color system in which the gamut is a plane within the color space (compare FIG. 4). For illustrative purposes, a square gamut and the discrete reproduction system is capable of reproducing 25 points in the color space. Graphically, the selected colors are maximally distant from each other to obtain equiperceptible steps. The implementation of the present invention utilizes the Munsell book of color and the CIE Lab space to obtain a numerical approximation to the selected colors within the gamut.

Full Color System

FIG. 8 illustrates implementation of the present invention in a full color system, where the available gamut is a cube within the the color space of FIG. 4. The method of the present invention maximizes the difference between the selected colors within the available gamut which in turn causes the selected colors to be approximately equal in distance to one another.

As an example, assume a reproduction system such as a digital photographic camera or printer where two bits are used to encode each of the three color variables hue, saturation, and luminance. Therefore four values can be stored for each color variable. Assume that the available gamut of this reproduction process includes all colors within the cube between 0 and 0.6. That is, in FIG. 8 the L, a, and b coordinates of the gamut are between 0 and 0.6. The method of the present invention could then reproduce all colors obtained by all possible combinations of:

L = 0, 0.2, 0.4, and 0.6.
a = 0, 0.2, 0.4, and 0.6.
b = 0, 0.2, 0.4, and 0.6.

I claim:

1. A method of selecting colors from a color space for use in a discrete reproduction printing system having a maximum number of points that can be produced, comprising the steps of:

defining a gamut in the color space that can be produced by the printing system;

determining a maximum number of points that can be reproduced with the printing system;

plotting a certain number of color points, less than or equal to said maximum number, in the gamut with a perceived distance between adjacent color points maximized, achieving a distance approximately equal between all plotted color points to approximate equiperceptible increments between the plotted color points within the gamut.

2. The method according to claim 1, wherein the discrete reproduction printing system processes data digitally, including the steps of:

digitally representing the plotted color points,
storing digital values of the plotted points, and
retrieving the digital values of the plotted color points during printing to selectively reproduce the plotted color points.

3. The method according to claim 1, wherein the printing system is two color and the gamut consists of a surface, the defining step including determining coordinates of the points defining line boundaries of the gamut.

4. The method according to claim 1, wherein the printing system is full color and the gamut consists of a volume, the defining step including determining coordinates of the points defining surface boundaries of the gamut.

5. The method according to claim 1, wherein the printing system is a gray scale printer and the gamut is a locus of points ranging between white and black.

6. The method according to claim 5, wherein the plotting step includes selecting said certain number approximately equally spaced in luminance from white to black.

7. The method according to claim 6, wherein the printing system includes a 4-bit digital memory to encode a location of a point within the gamut, the number of reproducible points being 16 or less and said plotting step comprising equally spacing said 16 or less points in luminance from white to black.

8. The method according to claim 6, including the additional step of numerically approximating the luminance of said certain number of points.

9. The method according to claim 8, including the additional step of approximating a desired print density corresponding to equiperceptible luminance of said certain number of points.

10. The method according to claim 9, each of said certain number of points having a luminance value and a representative Munsell value, the approximating print density step using a cube root approximation where:

$$\text{Munsell Value } (L) = 25 \sqrt[3]{\frac{100 Y_n}{Y_o}} - 16$$

where $Y_n$ is the luminance value of a desired gray level to be printed and $Y_o$ is a reference white luminance.

11. The method according to claim 10, including the step of calculating a print density $d_n$ corresponding to the luminance of the desired gray level $Y_n$ using the following relationship $d_n = \log 10 Y_n.$

* * * * *